(12) United States Patent
Bucklaew et al.

(10) Patent No.: US 10,041,774 B2
(45) Date of Patent: Aug. 7, 2018

(54) MULTI-HYPOTHESIS FIRE CONTROL AND GUIDANCE

(71) Applicant: The Charles Stark Draper Laboratory, Inc., Cambridge, MA (US)

(72) Inventors: Tom P. Bucklaew, Jamaica Plain, MA (US); Christopher M. Gibson, Needham, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 75 days.

(21) Appl. No.: 14/876,306

(22) Filed: Oct. 6, 2015

(65) Prior Publication Data

US 2016/0097621 A1    Apr. 7, 2016

Related U.S. Application Data

(60) Provisional application No. 62/060,388, filed on Oct. 6, 2014.

(51) Int. Cl.
*G01C 23/00* (2006.01)
*F42B 15/01* (2006.01)
*G05D 1/10* (2006.01)
*G05D 1/12* (2006.01)

(52) U.S. Cl.
CPC ............. *F42B 15/01* (2013.01); *G05D 1/107* (2013.01); *G05D 1/12* (2013.01)

(58) Field of Classification Search
CPC .......... F42B 15/01; G05D 1/101; G05D 1/104
See application file for complete search history.

(56) References Cited

U.S. PATENT DOCUMENTS

| | | | | |
|---|---|---|---|---|
| 5,637,826 A * | 6/1997 | Bessacini | ................. | F41G 7/32 114/21.1 |
| 6,231,003 B1 * | 5/2001 | Hibma | .................... | B64D 7/08 244/3.22 |
| 7,026,980 B1 * | 4/2006 | Mavroudakis | ........ | G01S 13/723 342/101 |
| 7,151,478 B1 * | 12/2006 | Adams | ................. | G01S 13/325 342/62 |
| 7,394,047 B1 * | 7/2008 | Pedersen | .................. | F41G 7/30 244/3.1 |

(Continued)

*Primary Examiner* — Ian Jen
(74) *Attorney, Agent, or Firm* — Christopher J. McKenna; Foley & Lardner LLP

(57) ABSTRACT

This disclosure provides systems, methods, and apparatus for intercepting a moving target by a plurality of interceptors that individually have insufficient capability to achieve intercept. An electronic processor can receive information corresponding to a state of the moving target at a first time. The electronic processor can determine a plurality of hypotheses for the future maneuvers of the moving target. The hypotheses can be based in part on the state of the moving target at the first time and the location of any defended assets. The electronic processor can assign a respective target maneuver hypothesis or set of hypotheses to each of a plurality of interceptors. The electronic processor can assign firing times and/or initial guidance commands to each interceptor. The electronic processor can control each interceptor to maneuver such that the moving target is intercepted, based on the respective target maneuver hypotheses.

18 Claims, 4 Drawing Sheets

(56) References Cited

U.S. PATENT DOCUMENTS

| | | | | |
|---|---|---|---|---|
| 7,473,876 B1* | 1/2009 | Pedersen | F41G 7/30 | |
| | | | 244/3.1 | |
| 7,511,252 B1* | 3/2009 | Pedersen | F41G 7/30 | |
| | | | 244/3.1 | |
| 7,663,528 B1* | 2/2010 | Malakian | G01S 13/723 | |
| | | | 342/13 | |
| 7,875,837 B1* | 1/2011 | Szabo | F41G 7/007 | |
| | | | 244/3.1 | |
| 2002/0083027 A1* | 6/2002 | Biggers | F41G 7/22 | |
| | | | 706/15 | |
| 2005/0242242 A1* | 11/2005 | Yanushevsky | F41G 7/22 | |
| | | | 244/195 | |
| 2007/0040062 A1* | 2/2007 | Lau | F41G 3/147 | |
| | | | 244/3.16 | |
| 2007/0158492 A1* | 7/2007 | Lam | F41G 7/2206 | |
| | | | 244/3.15 | |
| 2011/0143319 A1* | 6/2011 | Bennett | G09B 9/301 | |
| | | | 434/14 | |
| 2012/0312876 A1* | 12/2012 | Bland | F41A 17/08 | |
| | | | 235/417 | |
| 2013/0092785 A1* | 4/2013 | Tournes | F41G 7/22 | |
| | | | 244/3.2 | |
| 2014/0076142 A1* | 3/2014 | Hyde | F41H 5/007 | |
| | | | 89/36.17 | |
| 2014/0249744 A1* | 9/2014 | Andersson | G01C 21/3415 | |
| | | | 701/410 | |
| 2014/0249745 A1* | 9/2014 | Brege | F41H 13/00 | |
| | | | 701/411 | |
| 2014/0309836 A1* | 10/2014 | Ollis | G08G 1/22 | |
| | | | 701/25 | |
| 2015/0015869 A1* | 1/2015 | Smith | G01S 17/023 | |
| | | | 356/28.5 | |

* cited by examiner

MULTI-HYPOTHESIS FIRE CONTROL AND GUIDANCE

RELATED APPLICATION

This application claims priority to and the benefit of U.S. Provisional Patent Application No. 62/060,388, titled "MULTI-HYPOTHESIS FIRE CONTROL AND GUIDANCE", filed on Oct. 6, 2014, the contents of which are hereby incorporated by reference in their entirety for all purposes.

BACKGROUND

Defending assets from missiles, guided munitions, or other moving targets presents many challenges. To intercept such a moving target with a high probability of success, the interceptor generally needs to be more maneuverable than the moving target. However, many moving targets are highly maneuverable. Therefore, maintaining an interceptor maneuverability advantage over moving targets can be difficult, impossible, or, at a minimum, cost prohibitive.

SUMMARY

The systems, methods and devices of the disclosure each have several innovative aspects, no single one of which is solely responsible for the desirable attributes disclosed herein.

One innovative aspect of the subject matter described in this disclosure can be implemented in a method for intercepting a moving target. The method includes receiving, by an electronic processor, information corresponding to a state of the moving target at a first time. The method includes determining, by the electronic processor, a plurality of target maneuver hypotheses. The target maneuver hypotheses can be based in part on the state of the moving target at the first time. The method includes assigning, by the electronic processor, a respective target maneuver hypothesis to each of a plurality of interceptors. The method includes controlling, by the electronic processor, each interceptor to maneuver so as to intercept the moving target, based on the respective target maneuver hypotheses.

In some implementations, the information corresponding to the state of the moving target at the first time includes at least one of position information, velocity information, acceleration information, and orientation information. In some implementations, determining the plurality of target maneuver hypotheses can include determining the plurality of target maneuver hypotheses based on ballistic motion of the moving target. In some implementations, determining the plurality of target maneuver hypotheses can include determining the plurality of target maneuver hypotheses based on a maximum maneuverability of the moving target.

In some implementations, the number of available interceptors is less than the number of target maneuver hypotheses. The method can therefore include evaluating, by the electronic processor, each of the plurality of target maneuver hypotheses to determine a probability for each target maneuver hypothesis and assigning, by the electronic processor, the target maneuver hypotheses to the interceptors based on the determined probabilities.

In some implementations, the method can include receiving, by the electronic processor, information corresponding to a state of the moving target at a second time occurring after the first time. The method can include updating, by the electronic processor, at least one target maneuver hypothesis to generate an updated target maneuver hypothesis, based in part on the state of the moving target at the second time. The method can include controlling, by the electronic processor, the at least one respective interceptor to maneuver so as to intercept the moving target based on the updated target maneuver hypothesis.

In some implementations, the method can include determining, by the electronic processor, a type of the moving target. In some implementations, controlling each interceptor to maneuver so as to intercept the moving target can include wirelessly transmitting flight instructions to each interceptor. In some implementations, the step of assigning a respective target maneuver hypothesis to each of the plurality of interceptors is performed prior to deployment of the interceptors. The method also can include deploying each of the plurality of interceptors. In some implementations, deploying the interceptors includes launching a missile. In some implementations, deploying the interceptors includes firing guided munitions.

Another innovative aspect of the subject matter described in this disclosure can be implemented in a system for intercepting a moving target. The system includes a plurality of interceptors. The system includes a sensor configured to determine information corresponding to a state of the moving target at a first time. The system includes an electronic processor communicatively coupled to the sensor and to the plurality of interceptors. The electronic processor is configured to determine a plurality of target maneuver hypotheses based in part on the state of the moving target at the first time. The electronic processor is configured to assign a respective target maneuver hypothesis to each of the plurality of interceptors. The electronic processor is configured to control each interceptor to maneuver so as to intercept the moving target, based on the respective target maneuver hypotheses.

In some implementations, the information corresponding to the state of the moving target at the first time includes at least one of position information, velocity information, acceleration information, and orientation information. In some implementations, the electronic processor is further configured to determine the plurality of target maneuver hypotheses based on ballistic motion of the moving target. In some implementations, the electronic processor is further configured to determine the plurality of target maneuver hypotheses based on a maximum maneuverability of the moving target.

In some implementations, the number of available interceptors is less than the number of target maneuver hypotheses. The electronic processor can be further configured to evaluate each of the plurality of target maneuver hypotheses to determine a probability for each target maneuver hypothesis and assign the target maneuver hypotheses to the interceptors based on the determined probabilities.

In some implementations, the electronic processor is further configured to receive information corresponding to a state of the moving target at a second time occurring after the first time. The electronic processor also can be configured to update at least one target maneuver hypothesis to generate an updated target maneuver hypothesis, based in part on the state of the moving target at the second time. The electronic processor also can be configured to control the at least one respective interceptor to maneuver so as to intercept the moving target based on the updated target maneuver hypothesis.

In some implementations, the electronic processor is further configured to determine a type of the moving target. In some implementations, the electronic processor is further configured to control each interceptor to maneuver so as to intercept the moving target by wirelessly transmitting flight instructions to each interceptor. In some implementations, the electronic processor is configured to perform the step of assigning a respective target maneuver hypothesis to each of the plurality of interceptors prior to deployment of the interceptors and then to deploy each of the plurality of interceptors.

BRIEF DESCRIPTION OF THE DRAWINGS

Like reference numbers and designations in the various drawings indicate like elements.

DETAILED DESCRIPTION

Figure 1:
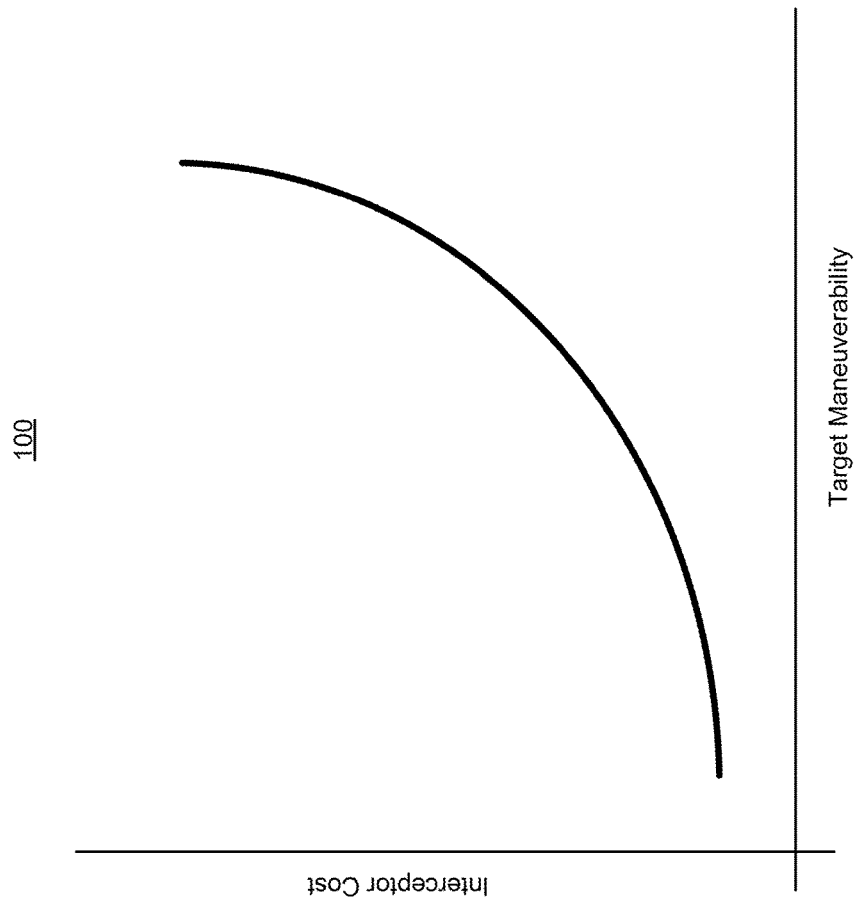
FIG. 1 shows a graph of an example relationship between interceptor maneuverability and cost.

FIG. 1 shows a graph 100 of an example relationship between interceptor maneuverability and cost. Modern weapons systems make use of highly maneuverable targets, such as missiles, guided munitions, or maneuverable reentry vehicles, to attack vulnerable assets. Defending assets against such moving targets can be technically challenging and expensive. For example, in order to increase the probability of successfully intercepting a target, an interceptor typically must be more maneuverable than the target. The interceptor can then respond more easily to movement of the target, which facilitates intercepting the target before the target reaches its intended destination (e.g., a defended asset such as a building, a ship, an aircraft, or a person). However, as shown in the graph 100, increasing the maneuverability of an interceptor can cause the cost of the interceptor to increase exponentially. Other characteristics, such as the size and weight of the interceptor, may also scale exponentially with interceptor maneuverability.

In some instances, interceptor maneuverability and cost may not have an exponential relationship. For example, cost may instead scale linearly with maneuverability. However, as a general rule, increased maneuverability cannot be achieved without increased cost, and as a result the graph of the relationship between maneuverability and cost is an increasing function for the vast majority of weapons systems. In some cases, the engineering challenges and increased costs associated with producing highly maneuverable interceptors may be prohibitive for reliably intercepting targets. Furthermore, once such an interceptor has been produced and deployed on the battlefield, further increasing its maneuverability (e.g., in response to increased enemy target capability) can also be prohibitively expensive.

Thus, in some implementations, the costs associated with developing a sufficiently maneuverable interceptor, as shown in the graph 100, can make it difficult or impossible to field an effective defense system using a single interceptor. However, in some implementations, it may be possible to develop a system including two or more interceptors, each of which may be less maneuverable or may have only a marginal maneuverability advantage relative to the moving target, that can intercept the moving target as reliably as a single highly maneuverable interceptor. The interceptors can be used collaboratively to intercept the moving target. Because the costs of an interceptor can scale exponentially with its maneuverability, a system having many less maneuverable interceptors can also be significantly cheaper than a system having a single highly maneuverable interceptor. Therefore, the cost to intercept a moving target using a group of individually less maneuverable interceptors can be substantially cheaper. Moreover, increasing the effectiveness of such a system can also be done more easily, for example by adding additional low-cost interceptors. Therefore, the system is less likely to become obsolete due to enhanced target maneuverability.

Figure 2:
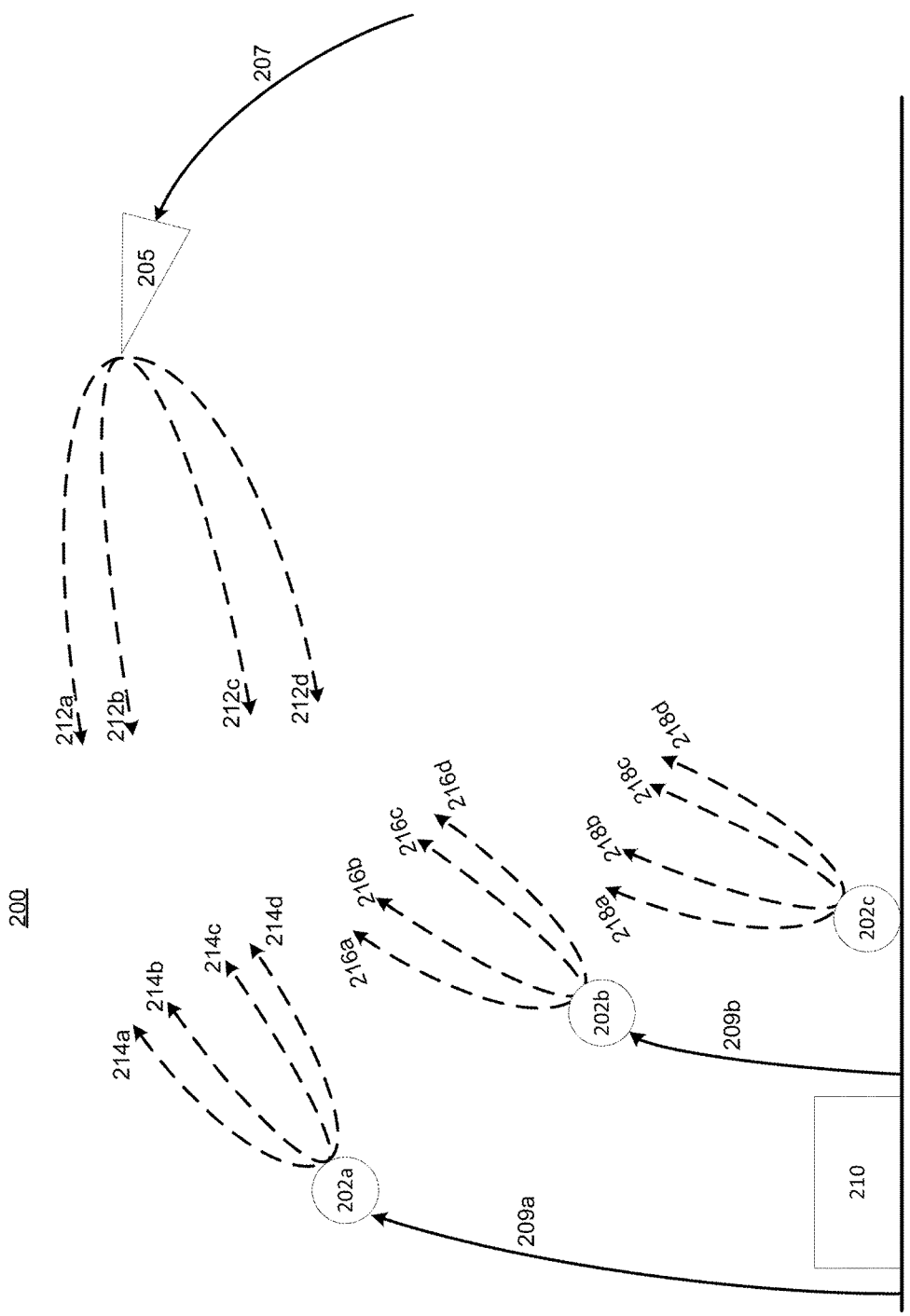
FIG. 2 shows two interceptors used collaboratively to intercept a moving target.

FIG. 2 shows a diagram 200 of three interceptors 202a, 202b, and 202c (generally referred to as interceptors 202) used collaboratively to intercept a moving target 205. The interceptors 202 are used as part of a defensive system to protect an asset 210 from being damaged or destroyed by the moving target 205. For example, in some implementations, the moving target 205 can be an enemy missile or other projectile launched with the intention of striking the asset 210. The asset 210 can be any vulnerable resource, such as a building, a ship, a piece of equipment, or a person. The interceptors 202 can be missiles, rockets, guided munitions, or any other type of guided projectile.

The diagram 200 shows the relative positions of the interceptors 202, the target 205, and the asset 210 at a time after the target 205 and the interceptors 202a and 202b have been deployed. The interceptor 202c has not yet been deployed. In the diagram, arrows formed from solid lines represent paths already traversed in the past, while arrows formed form broken lines represent potential paths that may be traversed in the future. For example, the solid line 207 represents the path traversed by the target before the time at which the interceptors 202 and target 205 are shown in FIG. 2. Similarly, the solid lines 209a and 209b represent the paths traversed by the interceptors 202a and 202b, respectively, prior to the time at which the interceptors 202 and target 205 are shown in FIG. 2. The lines 207 and 209 are solid to indicate that these paths are known with certainty, because they represent past positions of the target 205 and the interceptors 209. Several potential paths 212a-212d (generally referred to as paths 212) that the target 205 may follow in the future are shown in broken lines. Similarly, several potential paths 214a-214d (generally referred to as paths 214) of the interceptor 202a, potential paths 216a-216d (generally referred to as paths 216) of the interceptor 202b, and potential paths 218a-218d (generally referred to as paths 218) of the interceptor 202c are shown in broken lines. The broken lines indicate that that, while any of the paths 212, 214, 216, and 218 are possible, the actual paths to be traversed by the interceptors 202 and the target 205 in the future are uncertain as of the time at which the interceptors 202 and the target 205 are shown in FIG. 2. It should be understood that the potential paths 212, 214, 216, and 218 are illustrative only, and many other potential paths for each of the interceptors 202 and the target 205 may be possible.

Each of the potential paths 212, 214, 216, and 218 are generally contained within an envelope representing the manifold of future states for the respective interceptor 202 or target 205. In some implementations, the shape of each respective envelope can be a function of the maneuverability of each of the interceptors 202 and the target 205. For example, increasing the maneuverability of the target 205 can increase the angles at which the target 205 may turn at a given time, thereby increasing the size of its respective envelope. The same is true for the interceptors 202.

As shown, the potential paths 212 of the target 205 diverge at a wider angle than the potential paths 214 and 216 of the interceptors 202a and 202b, respectively. Therefore, in this example, the target 205 is more maneuverable than the interceptors 202. As discussed above, to reliably intercept a moving target with a single interceptor, an interceptor must maintain a maneuverability advantage over the moving target. However, in some implementations, by using two or more interceptors 202 collaboratively, the target 205 may be reliably intercepted despite the fact that each of the interceptors 202 is less maneuverable than the target 205.

For example, in some implementations, each interceptor 202 may be configured to intercept the target 205 under the assumption that the target 205 will choose a particular subset of its potential paths 212. The subsets of potential target paths 212 assigned to each interceptor 202 may be substantially non-overlapping, so that the interceptors can together be configured to reliably intercept the target 205 regardless of the potential path 212 actually traversed by the target 205. For example, hypotheses relating to the potential paths 212 most likely to be traversed by the target 205 can be computed. In some implementations, the hypotheses may be generated based on information relating to the state of the target 205, such as its size, weight, current position, and maneuverability, as well as the shape and position of the path 207 already traversed by the target 205. Sensors (e.g., radar systems) may be used to collect such information. In some implementations, the hypotheses may be evaluated, and the most likely hypotheses may be assigned to the interceptors 202 to improve the probability of successfully intercepting the target 205.

In some implementations, a system for defending the asset 210 may include additional interceptors 202. Three interceptors 202 are shown in FIG. 2 for illustrative purposes, but any number of interceptors 202 may be used. Each of the interceptors 202 may be assigned a different subset of hypotheses for potential maneuver strategies or paths 212 of the target 205. For example, in implementations in which the interceptors 202 do not maintain a significant maneuverability advantage over the target 205, it may be advantageous to increase the number of interceptors 205 used to intercept the target 205. Each interceptor may be capable of defending the asset 210 from only a relatively small subset of potential paths 212 to be traversed by the target 205, and therefore increasing the number of interceptors may be necessary to cover a sufficiently broad range of the potential paths 212. On the other hand, if the interceptors 202 are more maneuverable, fewer interceptors 202 may be required to reliably intercept the target 205 because each interceptor 202 can cover a larger subset of the potential paths 212 that the target 205 might take towards the asset 210.

In some implementations, the hypotheses of the most likely potential paths 212 to be traversed by the target 205 can be generated before any of the interceptors 202 are launched. For example, a fire control system may collect data relating to target 205, such as its position, velocity, and acceleration, as it moves toward the asset 210. Based on this data, the fire control system can determine a set of hypotheses for the movement of the target 205 in the future. In some implementations, a subset of hypotheses is assigned to each interceptor 202, and the interceptors 202 are launched according to their respective subsets of hypotheses. In some implementations, the fire control system can determine that some of the interceptors 202 should not be launched. As shown in FIG. 2, interceptors 202a and 202b may be launched, while interceptor 202c is not. In some implementations, the interceptors 202 may be launched at different times. For example, interceptors 202a and 202b can be launched while interceptor 202c remains on the ground. Subsequently, if the fire control system determines that another interceptor is required to achieve a desired probability of intercepting the target 205, a subset of hypotheses can be assigned to the interceptor 202c, and the interceptor 202c can be launched towards the target 205.

In some implementations, the hypotheses of the most likely potential paths 212 to be traversed by the target 205 may be updated while the interceptors 202 are in flight. For example, sensors may be used to track the target 205 and interceptors 202 to provide additional information that can be used to more accurately predict the potential path 212 to be traversed by the target. In some implementations, instructions relating to the updated hypotheses may be transmitted to each of the targets 202 during flight, so that the targets 202 may alter their flight paths to increase the probability of successfully intercepting the target 205.

Figure 3:
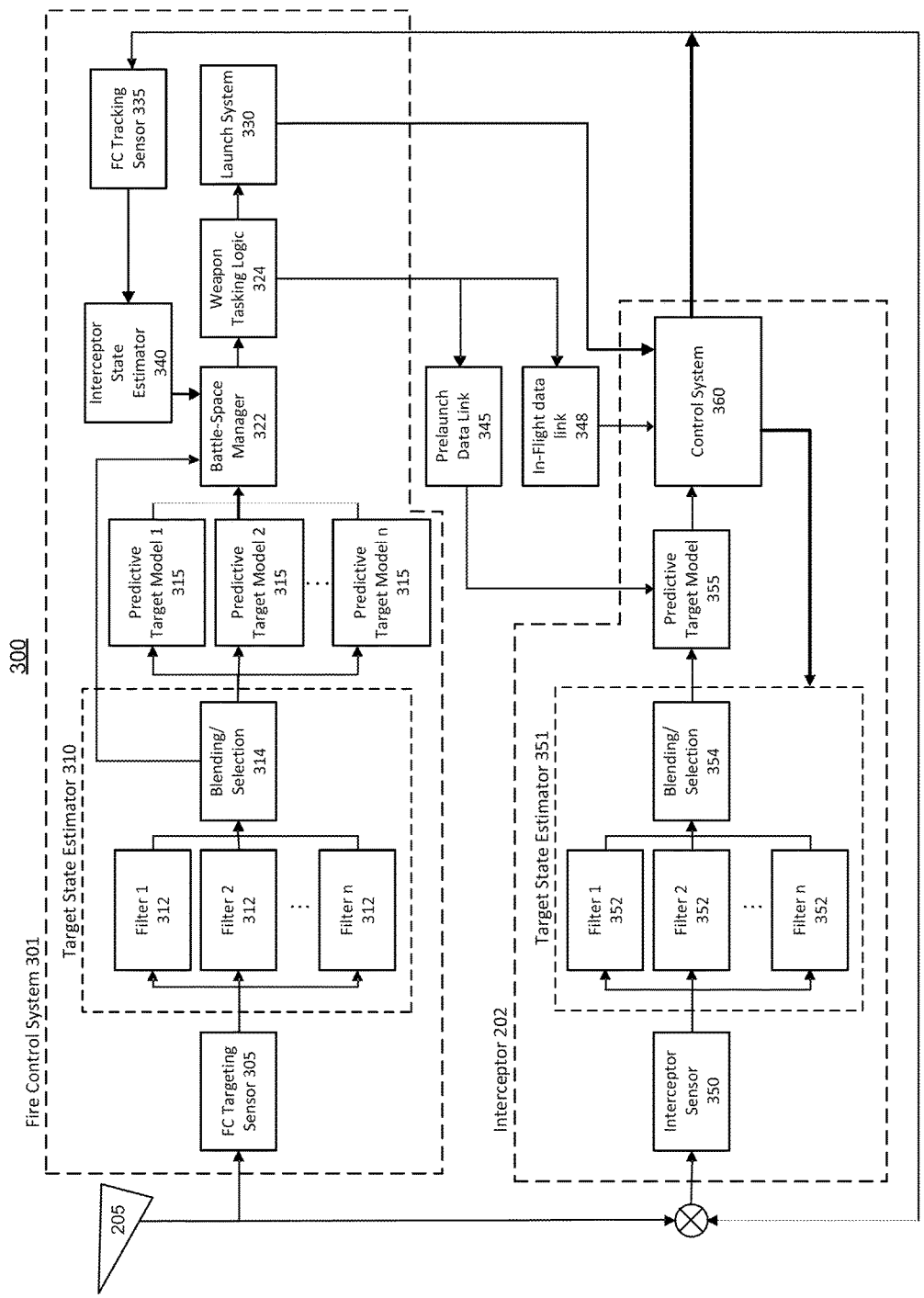
FIG. 3 shows a block diagram of a system for deploying multiple interceptors to intercept a moving target, according to an illustrative implementation.

FIG. 3 shows a block diagram of a system 300 for deploying multiple interceptors to intercept a moving target, according to an illustrative implementation. The system includes a fire control system 301 in communication with the interceptor 202 via a prelaunch data link 345 and an in-flight data link 348. Both the fire control system 301 and the interceptor 202 are also configured to receive information about the target 205, for example through the use of sensors configured to detect the motion or the target 205.

The fire control system 301 includes a fire control targeting sensor 305, a target state estimator 310 including a plurality of filters 312 and a blending/selection module 314, a plurality of predictive target models 315, a battle-space manager 322, a weapon tasking logic module 324, a launch system 330, a fire control tracking sensor 335, and an interceptor state estimator 340. The interceptor 202 includes an interceptor sensor 350, a target state estimator 351 including a plurality of filters 352 and a blending/selection module 354, a predictive target model 355, and a control system 360. The modules making up the system 300 may be implemented in hardware, software, or a combination thereof. For example, the modules may include sensors, memory devices, and processors configured to perform the tasks discussed below.

The fire control system 301 includes a fire control targeting sensor 305 that can receive information about the target 205. In some implementations, the fire control targeting sensor 305 can be a radar system. The fire control targeting sensor 305 can receive or determine information such as the velocity, position, and size of the target 205. The fire control targeting sensor 305 can also communicate target information to the target state estimator 310. In some implementations, the fire control targeting sensor 305 can track the target 205 over a period of time, and can continuously collect target data by tracking the target 205 during the period of time.

The target state estimator 310 can use the target information received from the fire control targeting sensor 305 to determine state information of the target at a particular time. In some implementations, the target state estimator 310 can determine several possibilities for the current state of the target 205, each of which can be based on a filtering technique applied by one of the plurality of filters 312. For example, the filters 312 may use raw data received from the fire control targeting sensor 305, such as radar or sonar data, to determine a velocity, acceleration, and/or maximum maneuverability of the target 205. In some implementations, the targeting state estimator 310 also can determine the type of target 205 tracked by the targeting sensor 305. For example, the targeting state estimator 310 may determine that the target 205 is a missile, a guided munition, or a maneuverable reentry body based on information relating to the target's size or velocity received from the targeting sensor 305 and processed by the filters 312. Information from the filters 312 is delivered to the blending/selection module 314. The blending/selection module 314 can use the output of the filters 312 to determine the current state of the target 205. In some implementations, the blending/selection module 314 can make this determination by selecting the output of one of the filters 312 and discarding the outputs of the others. In other implementations, the blending/selection module 314 can determine the current state of the target 205 based on a composite of the outputs of two or more of the filters 312. The targeting state estimator 310 can communicate this information to the predictive target models 315.

Each of the predictive target models 315 can use the information received from the targeting state estimator 310 to generate hypotheses relating to the paths that may be traversed by the target 205 in the future. For example, the predictive target models 315 may compute hypotheses relating to the potential paths 212 shown in FIG. 2. In some implementations, the predictive target models 315 may generate hypotheses based on a maximum maneuverability of the target 205. In some implementations, the predictive target models 315 may generate hypotheses based on common flight patterns of targets similar to the target 205. For example, the predictive target models 315 may generate a hypotheses indicating that the target 205 is likely to weave at particular frequencies and amplitudes that are within the range of capability of the target 205. Many other hypothesis scenarios may be possible based on the state of the target 205 and the relative position of the asset that the target 205 is attempting to strike. An arbitrary number of predictive target models 315 can be included in the fire control system 301.

The battle-space manager 322 can evaluate the hypotheses generated by the predictive target models 315. For example, the battle-space manager 322 may determine that the target 205 is more likely to follow the trajectories associated with some hypotheses than with others. In some implementations, the battle-space manager 322 may assign greater weight to the hypotheses that make use of the maximum maneuverability of the target 205, as it may be likely that the target 205 will attempt to use its maneuverability to avoid interception. The battle-space manager 322 may also group the hypotheses into hypothesis families. For example, a hypothesis family could include a subset of trajectory hypotheses that are spatially close to one another.

In some implementations, the battle-space manager 322 can use the hypothesis information to determine how to deploy any available interceptors 202 to intercept the target 205. For example, the battle-space manager 322 may determine a number of interceptors 202 to be deployed in a mission to intercept the target 205, based on the hypotheses. In some implementations, the hypotheses may indicate that the target 205 has a very high probability of following one of a limited number of potential paths. Therefore, the battle-space manager 322 may determine that relatively few interceptors 202 are needed to reliably intercept the target 205. In other implementations, the battle-space manager 322 may determine that many interceptors 202 are required to provide a sufficiently high probability of successfully intercepting the target 205. The battle-space manager 322 can transmit this information to the weapon tasking logic module 324, which can assign a hypothesis or subset of hypotheses to each of the interceptors 202 to be deployed via the prelaunch data link 345 or the in-flight data link 348. The weapon tasking logic module can also transmit to the launch system 330 an instructions indicating the time at which each of the respective interceptors 202 should be launched.

The interceptor 202 includes an interceptor sensor 350 that can receive information about the target 205. In some implementations, the interceptor targeting sensor 350 can be similar to the fire control targeting system 305. For example, the interceptor targeting sensor 350 can include a radar system or a sonar system for tracking the target 204. The interceptor targeting sensor 350 can determine information such as the velocity, position, and size of the target 205. Information from the control system 360 can also be transmitted to the interceptor sensor 350 through the summing junction 370, thereby allowing the interceptor sensor 350 to determine the relative motion between the interceptor 202 and the target 205. The interceptor sensor 350 can communicate this information to the target state estimator 351. In some implementations, the interceptor sensor 350 can track the target 205 over a period of time, and can continuously collect target data during the period of time.

The target state estimator 351 can use the target information received from the interceptor sensor 350 to determine state information of the target at a particular time. In some implementations, the target state estimator 351 can determine several possibilities for the current state of the target 205, each of which can be based on a filtering technique applied by one of the plurality of filters 352. For example, the filters 352 may use raw data received from the interceptor sensor 350 to determine information relating to the current state of the target 205, in a manner similar to the filters 352 discussed above. Information from the filters 352 is delivered to the blending/selection module 354. The blending/selection module 354 can use the output of the filters 352 to determine the current state of the target 205, and the targeting state estimator 351 can communicate this information to the predictive target model 355.

Before the interceptor 202 has been launched, the predictive target model 355 can receive information from the weapon tasking logic module 324 through the prelaunch data link 345. The prelaunch data link 345 can be any form of wired or wireless communications typically used in projectile communication systems. The predictive target model 355 can use the information received from the weapon tasking logic 324 and the target state estimator 351 to generate a hypothesis for the future trajectory of the target 205, and can communicate the hypothesis to the control system 360.

The control system 360 can receive a launch command from the launch system 330. After the interceptor 202 has been launched, the control system 360 also can receive information from the weapon tasking logic module 324 via the in-flight data link 348 and can control the interceptor 202 to execute the intercept solution provided by the predictive target model 355. During flight, the weapon tasking logic module 324 can provide updated flight instructions to the control system 360. In some implementations, the instructions received from the predictive target model 355 can be subordinate to instructions received from the weapon tasking logic 324. Therefore, the fire control system 301 can re-task the interceptor 202 based on an update to the hypothesis subset assigned to the interceptor 202.

Referring again to the fire control system 301, the fire control tracking sensor 335 can track the motion of each interceptor 202 after deployment. For example, the fire control tracking sensor 335 can be a radar system or a sonar system. Information obtained by the fire control tracking sensor 335 can be transmitted to an interceptor state estimator 340, which can determine state information relating to each interceptor 202. For example, the interceptor state estimator 340 may determine a velocity and position for each interceptor 202. This information can then be provided to the battle-space manager 322, which can update the intercept solution based on the new information. The battle-space manager 322 can relay this information to the weapon tasking logic module 324, which can in turn provide updated commands to each interceptor 202 via the in-flight data link 348.

Figure 4:
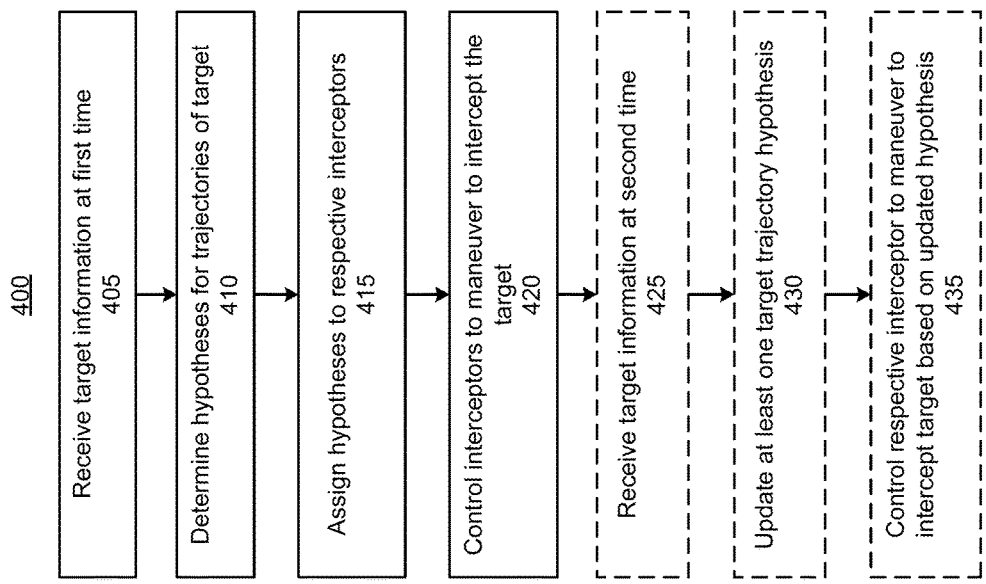
FIG. 4 shows a flow chart of a process for intercepting a moving target, according to an illustrative implementation.

FIG. 4 shows a flow chart of a process 400 for intercepting a moving target, according to an illustrative implementation. The process 400 includes receiving target information at a first time (stage 405), determining hypotheses for trajectories of the target (stage 410), assigning hypotheses to respective interceptors (stage 415), and controlling the interceptors to maneuver to intercept the target, based on their respective hypotheses (stage 420). In some implementations, the process 400 also includes receiving target information at a second time (stage 425), updating at least one target trajectory hypothesis (stage 430), and controlling the respective interceptor to maneuver to intercept the target based on the updated hypothesis (stage 435).

Referring again to FIG. 4, the process 400 includes receiving target information at a first time (stage 405). In some implementations, the target information can include bearing, range, size, velocity, acceleration, and position information. The target information may be determined, for example, by a radar system. In some implementations, sensor data (e.g., radar or optical sensor data) may be used to ascertain other information relating to the target, such as the type of target (e.g., a missile, a guided munition, a maneuverable reentry vehicle, etc.) and its maximum maneuverability.

The process 400 includes determining hypotheses for trajectories of the target (stage 410). In some implementations, the hypotheses may be based in part on the target state information determined in stage 405. For example, it may be hypothesized that the target will accelerate according to its maximum maneuverability as it moves toward a vulnerable asset. The hypotheses may be evaluated based on their probabilities. In some implementations, the hypotheses may be grouped into hypothesis families. For example, a hypothesis family may include all of the hypotheses that describe target trajectories within a given volume of space.

The process 400 includes assigning hypotheses to respective interceptors (stage 415). In some implementations, the only hypotheses whose probability meets a predetermined threshold are assigned to interceptors. Other hypotheses may be discarded. In some implementations, each interceptor may be assigned more than one hypothesis. For example, each interceptor may be assigned a family or families of hypotheses. In some implementations, the hypotheses are assigned to interceptors based on the capability of the interceptors to intercept targets that may move according to the hypotheses. Thus, more highly maneuverable interceptors may be assigned a greater number of hypotheses, while less maneuverable interceptors may be assigned fewer hypotheses. The hypotheses assigned to each interceptor may be non-overlapping, so that the interceptors can collaborate to cover a broad range of hypotheses for target trajectories.

The process 400 includes controlling the interceptors to maneuver so as to intercept the target, based on their respective hypotheses (stage 420). Launch commands can be sent to the interceptors that have been chosen to be deployed for a particular mission. Guidance commands can be sent to each respective deployed interceptor to cause the interceptor to move in such a way as to intercept the target under the assumption that the target will maneuver according to the hypothesis or hypotheses assigned to the interceptor.

In some implementations, the process 400 can include receiving target information at a second time (stage 425). For example, the system (e.g., a radar system) used to track the target at the first time (stage 405) may also be used to track the target at the second time. Additional information may therefore be collected at the second time that can help to determine the path of the target as it moves toward a targeted asset. In some implementations, target information can be received at additional times as well. For example, the system used to track the target can be configured to collect target information at regular or semi-regular time intervals. Updating the target information over time can allow the system to improve the hypothesis of future target trajectory.

The process 400 can also include updating at least one target trajectory hypothesis based on the target information received at the second time (stage 430). For example, as additional target information is received (stage 425) at the second time, the likely trajectories of the target may be known with greater certainty, and the probabilities assigned to certain of the hypotheses may be altered. In some implementations, hypotheses not considered based on the target information received at the first time may be generated based on the target information received at the second time.

The process 400 can also include controlling the respective interceptor to maneuver so as to intercept the target based on the updated hypothesis (stage 435). In some implementations, guidance commands may be sent to the respective interceptor whose target trajectory hypothesis information has been updated. For example, guidance commands may be sent to the interceptor wirelessly while the interceptor is in flight. The interceptor may then respond to the guidance commands by altering its flight path in response to the updated hypotheses.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for intercepting a moving target, the method comprising:
   receiving, by an electronic processor, information corresponding to a state of the moving target at a first time;
   determining, by the electronic processor, a plurality of target maneuver hypotheses, each of the plurality of target maneuver hypotheses based in part on the state of the moving target at the first time;
   assigning, by the electronic processor, a respective target maneuver hypothesis of the plurality of target maneuver hypotheses to a respective envelope of each of a plurality of interceptors, wherein the respective envelopes for the plurality of interceptors are substantially non-overlapping;
   launching each of the plurality of interceptors;
   controlling, by the electronic processor, each interceptor to maneuver so as to intercept the moving target, based on the respective target maneuver hypotheses;
   receiving, by the electronic processor, information corresponding to a state of the moving target at a second time occurring after the first time and after each of the plurality of interceptors has been launched;
   updating, by the electronic processor, at least one target maneuver hypothesis to generate an updated target maneuver hypothesis, based in part on the state of the moving target at the second time; and
   controlling, by the electronic processor, the at least one respective interceptor to maneuver so as to intercept the moving target based on the updated target maneuver hypothesis.

2. The method of claim 1, wherein the information corresponding to the state of the moving target at the first time includes at least one of position information, velocity information, acceleration information, and orientation information.

3. The method of claim 1, wherein determining the plurality of target maneuver hypotheses further comprises determining the plurality of target maneuver hypotheses based on ballistic motion of the moving target.

4. The method of claim 1, wherein determining the plurality of target maneuver hypotheses further comprises determining the plurality of target maneuver hypotheses based on a maximum maneuverability of the moving target.

5. The method of claim 1, wherein the number of available interceptors is less than the number of target maneuver hypotheses, the method further comprising:
   evaluating, by the electronic processor, each of the plurality of target maneuver hypotheses to determine a probability for each target maneuver hypothesis; and
   assigning, by the electronic processor, the target maneuver hypotheses to the interceptors based on the determined probabilities.

6. The method of claim 1, further comprising determining, by the electronic processor, a type of the moving target.

7. The method of claim 1, wherein controlling each interceptor to maneuver so as to intercept the moving target comprises wirelessly transmitting flight instructions to each interceptor.

8. The method of claim 1, wherein the step of assigning a respective target maneuver hypothesis to each of the plurality of interceptors is performed prior to deployment of the interceptors, the method further comprising deploying each of the plurality of interceptors.

9. The method of claim 8, wherein deploying the interceptors includes launching a missile.

10. The method of claim 8, wherein deploying the interceptors includes firing guided munitions.

11. A system for intercepting a moving target, the system comprising:
   a plurality of interceptors;
   a sensor configured to determine information corresponding to a state of the moving target at a first time; and
   an electronic processor communicatively coupled to the sensor and to the plurality of interceptors, the electronic processor configured to:
     determine a plurality of target maneuver hypotheses, each of the plurality of target maneuver hypotheses based in part on the state of the moving target at the first time;
     assign a respective target maneuver hypothesis of the plurality of target maneuver hypotheses to a respective envelope of each of the plurality of interceptors, wherein the envelopes for the plurality of interceptors are substantially non-overlapping;
     cause each of the plurality of interceptors to be launched;
     control each interceptor to maneuver so as to intercept the moving target, based on the respective target maneuver hypotheses;
     receive information corresponding to a state of the moving target at a second time occurring after the first time and after each of the plurality of interceptors has been launched;
     update at least one target maneuver hypothesis to generate an updated target maneuver hypothesis, based in part on the state of the moving target at the second time; and
     control the at least one respective interceptor to maneuver so as to intercept the moving target based on the updated target maneuver hypothesis.

12. The system of claim 11, wherein the information corresponding to the state of the moving target at the first time includes at least one of position information, velocity information, acceleration information, and orientation information.

13. The system of claim 11, wherein the electronic processor is further configured to determine the plurality of target maneuver hypotheses based on ballistic motion of the moving target.

14. The system of claim 11, wherein the electronic processor is further configured to determine the plurality of target maneuver hypotheses based on a maximum maneuverability of the moving target.

15. The system of claim 11, wherein the number of available interceptors is less than the number of target maneuver hypotheses, and wherein the electronic processor is further configured to:
   evaluate each of the plurality of target maneuver hypotheses to determine a probability for each target maneuver hypothesis; and
   assign the target maneuver hypotheses to the interceptors based on the determined probabilities.

16. The system of claim 11, wherein the electronic processor is further configured to determine a type of the moving target.

17. The system of claim 11, wherein the electronic processor is further configured to control each interceptor to maneuver so as to intercept the moving target by wirelessly transmitting flight instructions to each interceptor.

18. The system of claim 11, wherein the electronic processor is configured to:
   perform the step of assigning a respective target maneuver hypothesis to each of the plurality of interceptors prior to deployment of the interceptors; and
   deploy each of the plurality of interceptors.

\* \* \* \* \*